United States Patent [19]

Graves

[11] 4,146,050
[45] Mar. 27, 1979

[54] PLASTIC LINED SAMPLE VALVE

[75] Inventor: Gail W. Graves, Richmond, Tex.

[73] Assignee: Peabody Dore' Corporation, Fort Bend County, Tex.

[21] Appl. No.: 826,298

[22] Filed: Aug. 22, 1977

[51] Int. Cl.² .................. F16K 1/04; F16K 25/00
[52] U.S. Cl. .................... 137/375; 251/145; 251/210; 251/225; 251/285
[58] Field of Search ............. 137/321, 322, 375; 251/145, 210, 225, 285, DIG. 1

[56] References Cited

U.S. PATENT DOCUMENTS

| 1,406,748 | 2/1922 | Massip | 251/285 X |
| 2,202,735 | 5/1940 | Johnson | 137/375 |
| 2,980,392 | 4/1961 | Greenwood | 251/210 |
| 3,237,638 | 3/1966 | Rothenberg | 137/321 X |
| 3,253,612 | 5/1966 | Curatola et al. | 251/285 X |
| 3,420,262 | 1/1969 | O'Neill | 137/375 |
| 3,474,820 | 10/1969 | O'Neill | 137/375 |
| 3,498,319 | 3/1970 | Schnabel | 137/375 |

FOREIGN PATENT DOCUMENTS

| 188280 | 1/1957 | Austria | 251/285 |
| 2228996 | 12/1974 | France | 251/285 |
| 393856 | 11/1965 | Switzerland | 251/285 |
| 5789 of | 1908 | United Kingdom | 251/285 |

Primary Examiner—Gerald A. Michalsky
Attorney, Agent, or Firm—Fulbright & Jaworski

[57] ABSTRACT

A valve body for insertion in a fluid line having a sampling passageway extending from the interior to the exterior of the body for sampling from or injecting ingredients into the fluid line. A first annular tapered valve seat in the passageway and a second tubular valve seat in the passageway axially aligned with the first valve seat. A valve stem moves toward and away from said valve seats and includes a first tapered valve element adapted to seat on the first seat and a second cylindrical valve element adapted to seat on the second seat. Means rotatably move the valve stem towards and away from the valve seat for wiping the sealing areas upon closing. A plastic lining covers all of the interior areas of the valve that are exposed to contact with fluid flowing through the valve. The end of the stem moves to a position generally tangent to the internal diameter of the valve body for preventing material buildup in the passageway.

1 Claim, 1 Drawing Figure

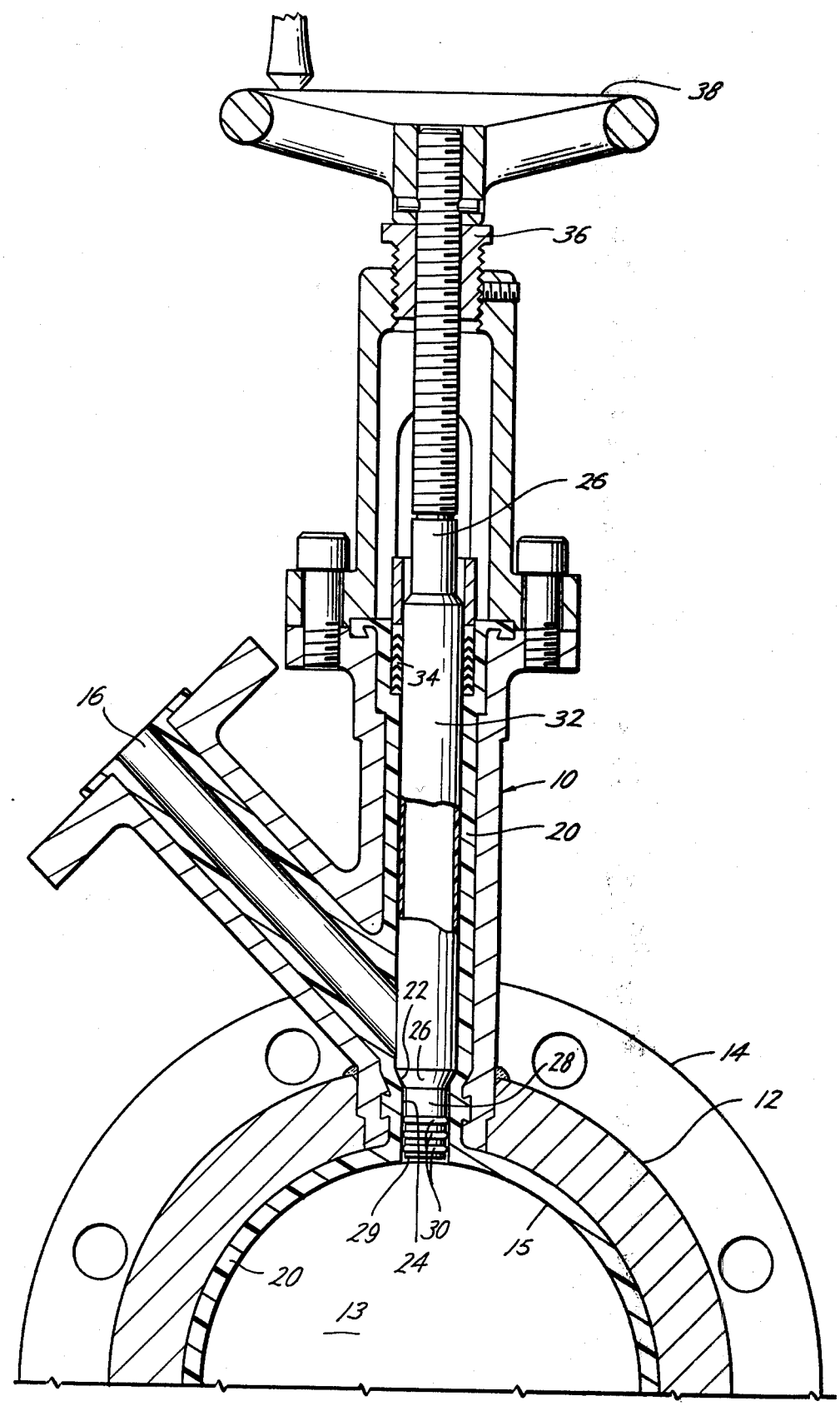

PLASTIC LINED SAMPLE VALVE

BACKGROUND OF THE INVENTION

Generally, the current method of either injecting materials into a fluid line or sampling the contents of a fluid line is to attach an instrument connection or a tee in the line and then attach a separate conventional valve for controlling and containing the fluid flow. Such arrangements increase possible leak areas and possible ineffective sealing. Furthermore, some media may solidify in and clog the sampling line. The present invention is directed to an improved integral valve which may be installed in a fluid line, will provide positive sealing, will prevent buildup of solids in the sampling line, and is designed to allow sampling from or injection into the line and can be used in draining and/or venting the line.

SUMMARY

The present invention is directed to a plastic lined valve for insertion in to a fluid line. A sampling passageway extends from the interior to the exterior of the body, and a pair of valve seats are provided in the passageway for insuring positive sealing of the passageway. One of the valve seats is a tapered annular valve seat and the second valve seat is a tubular valve axially aligned with the annular valve seat. A valve stem is moveable through the valve seats and includes a first tapered valve element for seating on the annular seat and a second cylindrical valve seat for seating on the tubular valve seat. The annular tapered valve seat and coacting valve element provide a high pressure seal and the tubular valve seat and coacting cylindrical seat provides a seal while allowing latitude in the position of the cylindrical element in the tubular seat.

Yet a further object of the present invention is the provision of means for rotatably moving the valve stem towards and away from the valve seats which act to wipe the sealing areas free of any debris that might hinder the sealing effect of the sealing areas.

A further object is the provision of a valve stem which extends through the sampling passageway to a position adjacent the inside of the valve body for preventing buildup of solids and consequently blocking of the sampling passageway.

Yet a still further object of the present invention is the provision of an adjustment nut for limiting the extent of travel of the stem but which can be adjusted when wear occurs on the tapered seat so all the valve elements will seat tighter.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

The drawing is a fragmentary elevational view, in cross section of the valve of the present invention shown in the closed position.

DESCRIPTION OF THE PREFERRED EMBODIMENT

Referring now to the drawing, the reference numeral 10 generally indicates the valve of the present invention and includes a body 12 which is clamped between a flange 14 of a fluid line on each side of the body. The body 12 also includes a passageway 16 extending from the interior 13 to the exterior of the body 12. This type of valve is useful for example in the chemical processing industry where a sample of the fluid in the line is desired to be analyzed to see if the product being manufactured is up to specification or is used to inject ingredients through the passageway 16 into the interior 13 of the valve body 12 or is used in draining and/or venting the line. Preferably, all areas of the valve that come in contact with the fluid passing through the interior 13 are plastic lined for handling corrosive chemicals such as by a plastic liner 20 which covers the interior of the valve body 12 and the passageway 16. Any suitable plastic is satisfactory such as fluorocarbons, FEP, PFA, $VF_2$, or polypropylene.

Two sealing areas are provided in the passageway 16. Thus, a first annular tapered valve seat 22 is provided in the passageway 16 and a second tubular valve seat 24 is provided, preferably adjacent the inside diameter 15 of the body 12. The valve seats 22 and 24 are axially aligned with each other.

A valve stem 26 is movable toward and away from the valve seats 22 and 24 and includes a first annular tapered valve element 26 for seating on the tapered seat 22 and includes a second cylindrical valve element 28 adapted to coact with and seat in the tubular valve seat 24. The valve element 28 may include one or more O-rings 30. Preferably, the portion 32 of the valve stem 26 that is exposed to fluid is covered with a suitable plastic such as PTFE fluorocarbon.

It is to be noted that the coaction of the tapered valve element 26 on the tapered seat 22 provides a high pressure seal for sealing off the passageway 16. It is also to be noted that even though the cylindrical valve element 28 is fixed relative to the valve element 26, the valve element 28 will seat and seal with its coacting tubular seat 24 over a wide latitude of seating area to provide a seal even though the sealing areas between the valve element 26 and seat 22 wear and require adjustment.

The valve stem 26 extends through a packing element 34 and threadably coacts with an adjustment nut 36 and an actuating wheel 38. It is desirable to rotatably move the stem 26 toward and away from the valve seats 22 and 24. Rotation tends to wipe the seating areas between the valve seats 22 and 24 and valve elements 26 and 28 free of any debris that might hinder the sealing effects of the valve. In addition, the adjustment nut 36 is threadably secured to the housing 12 and may provide means for adjustably limiting the extent of travel of the stem for preventing damage to the coacting plastic lined seats. In addition, the adjustment nut 36 may be rotated downwardly to compensate for any wear that may occur between the valve element 26 and the seat 24 to allow the element to seat tighter against the seat 22.

Furthermore, it is to be noted that the end 29 of the valve stem 28, in the closed position, extends to a position generally tangential to the internal diameter 15 of the valve body. Some fluids may solidify and some fluids may contain solids and the positioning of the end 29 of the stem in the innner end of the passageway 16 prevents the buildup of solids in the inner end of passageway 16 which will clog or block the passageway 16.

In operation, the hand operated actuator is backed off thereby retracting the stem 26 and the valve elements 26 and 28 from the seats 22 and 24 to allow the sampling or injection of material through the passageway 16. The stem 26 may then be rotatably moved toward the seats 22 and 24 to seat the valve elements 26 and 28 against the seats 22 and 24 while simultaneously wiping the sealing areas to insure a clean and complete seal in the dual valve arrangement and preventing the accumulation of solids in the passageway 16.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed in the spirit of the invention and the scope of the appended claims.

What is claimed is:

1. A plastic lined valve for removing or inserting fluid in a fluid line comprising,
    a valve body for insertion into a fluid line,
    a passageway extending from the side of the body from the interior to the exterior of the body,
    an annular tapered valve seat in the passageway,
    a tubular valve seat in the passageway axially aligned with the annular valve seat and positioned between the tubular valve seat and the interior of the valve body,
    a cylindrical smooth valve stem having an annular tapered valve element adapted to seat on the annular valve seat and having a cylindrical valve element with an O-ring seal adapted to seat on the tubular valve seat,
    a packing element in the interior of the body sealing engaging the exterior of the valve stem,
    rotating means connected to the valve stem on one side of the packing element remote from the seats for rotatably moving the stem and valve elements toward and away from the valve seats,
    said valve stem in the closed position extends through the passageway to the interior of the body, and
    a plastic lining covering the interior of the body, the interior of the passageway, and the exterior of the valve stem.

* * * * *